US009434294B2

(12) United States Patent
Salter et al.

(10) Patent No.: US 9,434,294 B2
(45) Date of Patent: Sep. 6, 2016

(54) PHOTOLUMINESCENT VEHICLE BADGE

(71) Applicant: Ford Global Technologies, LLC, Dearborn, MI (US)

(72) Inventors: Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 14/322,464

(22) Filed: Jul. 2, 2014

(65) Prior Publication Data

US 2015/0138796 A1    May 21, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*B60Q 1/26* (2006.01)
*B60Q 3/06* (2006.01)
*B60Q 1/00* (2006.01)
*B60R 13/00* (2006.01)

(52) U.S. Cl.
CPC ............ *B60Q 1/0011* (2013.01); *B60Q 1/2669* (2013.01); *B60R 13/005* (2013.01); *B60Q 3/06* (2013.01)

(58) Field of Classification Search
CPC .. B60Q 1/0011; B60Q 1/2669; B60R 13/005
See application file for complete search history.

(56) References Cited

U.S. PATENT DOCUMENTS

| | | | |
|---|---|---|---|
| 5,709,453 | A | 1/1998 | Krent et al. |
| 6,729,738 | B2 | 5/2004 | Fuwausa et al. |
| 6,773,129 | B2 | 8/2004 | Anderson, Jr. et al. |
| 6,851,840 | B2 | 2/2005 | Ramamurthy et al. |
| 6,871,986 | B2 | 3/2005 | Yamanaka et al. |
| 6,990,922 | B2 | 1/2006 | Ichikawa et al. |
| 7,213,923 | B2 | 5/2007 | Liu et al. |
| 7,264,366 | B2 | 9/2007 | Hulse |
| 7,264,367 | B2 | 9/2007 | Hulse |
| 7,441,914 | B2 | 10/2008 | Palmer et al. |
| 7,745,818 | B2 | 6/2010 | Sofue et al. |
| 7,752,791 | B2 | 7/2010 | Misawa et al. |

(Continued)

FOREIGN PATENT DOCUMENTS

| | | |
|---|---|---|
| CN | 2815776 Y | 9/2006 |
| CN | 201169230 Y | 12/2008 |

(Continued)

*Primary Examiner* — David V Bruce
(74) *Attorney, Agent, or Firm* — Vichit Chea; Price Heneveld LLP

(57) ABSTRACT

An emblem illumination assembly for a vehicle is disclosed. The illumination assembly comprises an external cover defining a profile shape and an optic device proximate the external cover. The optic device further includes an interior surface. A light source is located proximate the interior surface and is configured to emit a first emission into the optic device. The optic device comprises a photoluminescent material disposed between the light source and the external cover, wherein the photoluminescent material is configured to convert the first emission to emit a second emission.

20 Claims, 5 Drawing Sheets

(56) References Cited

U.S. PATENT DOCUMENTS

| | | |
|---|---|---|
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2013/0335997 A1* | 12/2013 | Roberts .................. G09F 21/04 362/583 |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 101337492 A | 1/2009 |
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

PHOTOLUMINESCENT VEHICLE BADGE

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to an exterior light source employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an emblem illumination assembly for a vehicle is disclosed. The illumination assembly comprises an external cover defining a profile shape and an optic device proximate the external cover. The optic device further includes an interior surface. A light source is located proximate the interior surface and is configured to emit a first emission into the optic device. The optic device comprises a photoluminescent material disposed between the light source and the external cover, wherein the photoluminescent material is configured to convert the first emission to emit a second emission.

According to another aspect of the present invention, an illumination system for a vehicle badge is disclosed. The illumination system comprises a badge that includes an external cover, an optic device, and a light source configured to output a first emission at a first wavelength. A light guide is optically connected to the optic device and is configured to transmit the first emission toward a closure mechanism. The closure mechanism comprises a lever and a first photoluminescent portion disposed proximate the lever. The first photoluminescent portion is configured to convert the first emission to a second emission to illuminate the lever.

According to yet another aspect of the present invention, a vehicle lighting system is disclosed. The lighting system includes a badge comprising an optic having a light source configured to output a first emission at a first wavelength. A light guide extends from the optic and is configured to direct the first emission toward a closure mechanism. The badge and the closure mechanism comprise a photoluminescent portion configured to convert the first emission to a second emission to illuminate the badge and the closure mechanism at a second wavelength.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Most modern automotive vehicles include a closure mechanism in the form of a secondary safety latch to ensure that the hood of the vehicle does not open while the vehicle is in motion. In many instances, the closure mechanism may provide a beneficial safety feature, but may not be located in a convenient and/or visible location. For example, after a hood or closure of a vehicle is "popped" from the interior of a vehicle, the safety latch may be significantly hidden within a small opening accessible proximate a forward portion of the hood. The disclosure provides for a lighting apparatus configured to illuminate a lever of a closure mechanism such that the closure mechanism may be effectively located in the small opening beneath the hood.

In some implementations, the disclosure may further provide a lighting apparatus configured to illuminate a vehicle badge, emblem, and/or logo. The term emblem as discussed herein may refer to a component of a vehicle configured to suggest a logo and/or branding of a group, company, and/or entity. The emblem may include or be formed to communicate shapes, forms, lettering, and various designs that may be functional and/or decorative. For example, an emblem may be configured to function as a portion of a grill or front portion of a vehicle and also correspond to a shape or form that may have some affiliation to a group, company, and/or entity.

Figure 1:
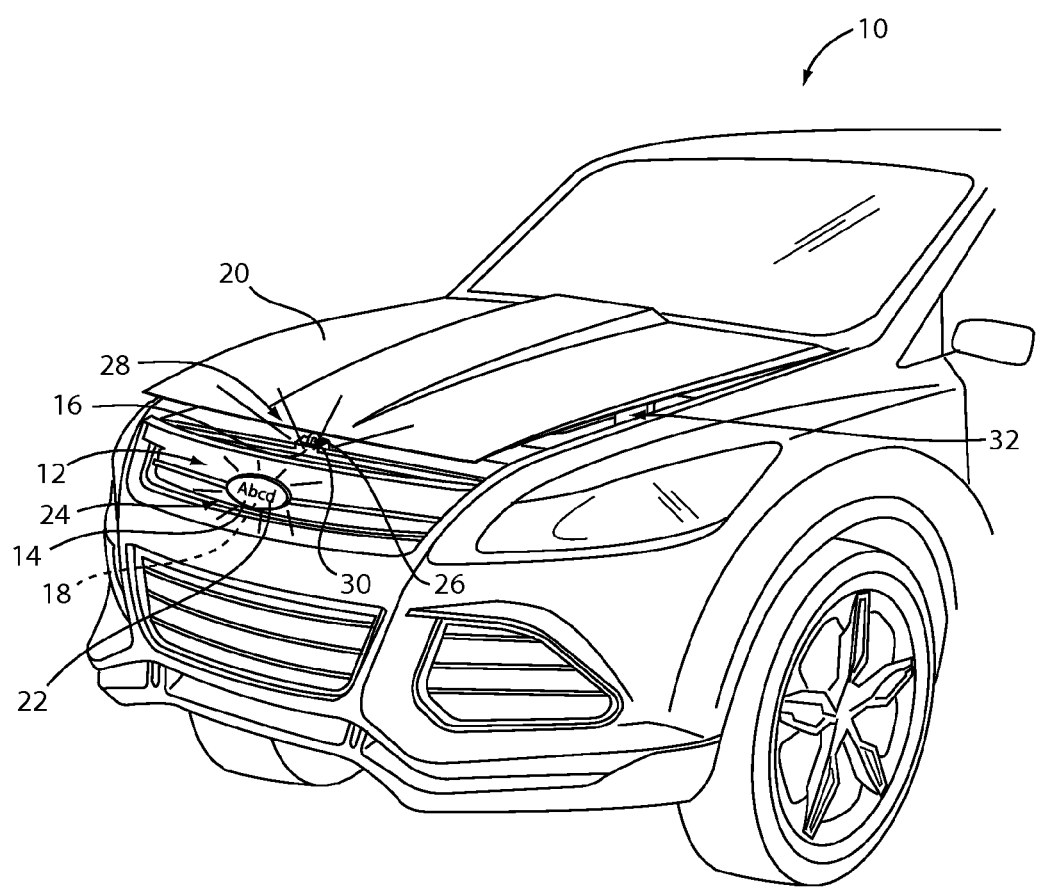
FIG. 1 is a perspective view of a vehicle comprising a lighting apparatus configured to illuminate a vehicle badge and a closure mechanism.

Referring to FIG. 1, a perspective view of a vehicle 10 comprising a lighting apparatus 12 configured to illuminate a vehicle badge 14 and a closure mechanism 16 is shown in accordance with the disclosure. In some implementations, the vehicle badge 14 and the closure mechanism 16 may be illuminated by a light source 18 of the lighting apparatus 12. The closure mechanism 16 may correspond to a vehicle closure latch, for example a hood latch or secondary safety latch. The closure mechanism 16 may be configured to lock a vehicle closure, for example a hood 20 of the vehicle 10 such that the hood 20 does not open when the vehicle 10 is in motion. The term closure mechanism as used herein may refer a mechanism configured to secure a barrier, closure, hood, and/or door.

The lighting apparatus 12 may incorporate the light source 18 proximate the vehicle badge 14. The light source 18 may be configured to output a first emission of light having a first wavelength. In response to receiving the first emission, a first photoluminescent portion 22 of the vehicle badge 14 may be configured to convert the first emission having the first wavelength to a second emission 24 having a second wavelength. The second wavelength may be longer than the first wavelength such that the second wavelength corresponds to a different color of light than the first wavelength. The second wavelength may also be configured such that it has an increased visual acuity relative to the first wavelength in the visible color spectrum of light.

The light source 18 may be in electrical communication with at least one switch and/or controller of the vehicle 10. In some implementations, the light source 18 may be selectively activated in response to an actuation of a switch or sensor configured to supply power to the light source 18 in response to the hood 20 being released, but still being locked by the secondary safety latch. In some implementations, the light source 18 may be selectively illuminated in response a headlight of the vehicle being activated.

Various systems and devices may be utilized to automatically activate and/or adjust the activation of the headlights in response to an ambient light condition, presence detection, or any form of sensory interface. The light source 18 may be illuminated selectively in combination with such automatic headlight systems. In some implementations, the light source 18 may also be configured to illuminate in response to a presence or proximity detection of a vehicle key or key fob, and/or a signal from a remote keyless entry device.

A portion of the first emission from the light source 18 may also be directed from the vehicle badge 14 by a light guide toward the closure mechanism 16. A second photoluminescent portion 26 may be disposed proximate the closure mechanism 16. The second photoluminescent portion 26 may be configured to convert the portion of the first emission at the first wavelength to a third emission 28. The third emission 28 may comprise a third wavelength configured to illuminate a lever 30, for example a hood release lever, such that the lever 30 is visible and illuminated in contrast to an engine compartment 32 of the vehicle 10. In this configuration, the lever 30 may be easily identified and actuated to disengage the closure mechanism 16 to access the engine compartment 32.

The third wavelength corresponding to the third emission 28 may be similar to the second wavelength of the second emission such that the second emission 24 and the third emission 28 output light that is substantially similar in color. In such configurations, a photoluminescent material or combination of photoluminescent materials may be similarly utilized for the first photoluminescent portion 22 and the second photoluminescent portion 26. In some implementations, the second wavelength and the third wavelength may be configured to emit different colors of light. The different colors of light may be generated by utilizing different photoluminescent materials or proportions thereof for each of the first photoluminescent portion 22 and the second photoluminescent portion 26.

The various implementations of the lighting apparatus 12 may provide for ambient lighting of the vehicle badge 14 and/or the closure mechanism 16. The ambient lighting generated by the first photoluminescent portion 22 and the second photoluminescent portion 26 may be configured to provide a wide range of colors of light emitted from the vehicle badge 14 and/or the closure mechanism 16. The various embodiments disclosed herein provide a novel approach for providing ambient light which may provide illumination for the badge 14 to the vehicle 10. The disclosure may also provide for beneficial utility to assist in locating a closure mechanism 16 or hood latch of the vehicle 10.

Figure 2A:
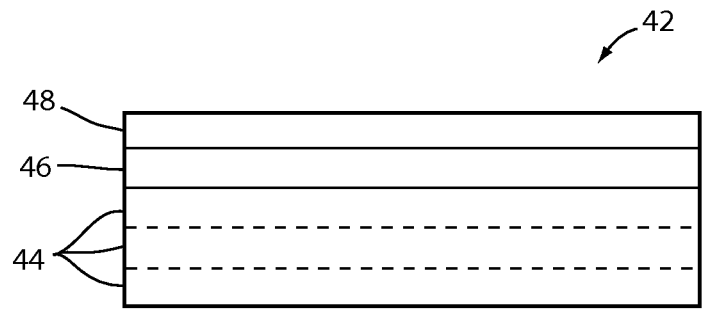
FIG. 2A illustrates a photoluminescent structure rendered as a coating.
Figure 2B:
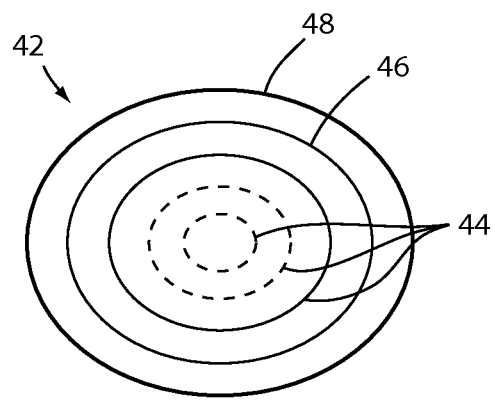
FIG. 2B illustrates the photoluminescent structure rendered as a discrete particle.
Figure 2C:
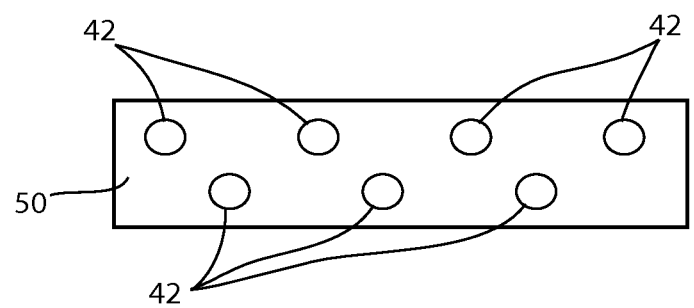
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the first photoluminescent portion 22 and the second photoluminescent portion 26 as discussed herein. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent and/or a fluorescent material. The photoluminescent material may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure. For clarity, the polymer matrix 50 comprising photoluminescent material may be referred to as the energy conversion layer 44 hereinafter to demonstrate that each may be similarly utilized to convert the first wavelength of light to at least a second wavelength.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
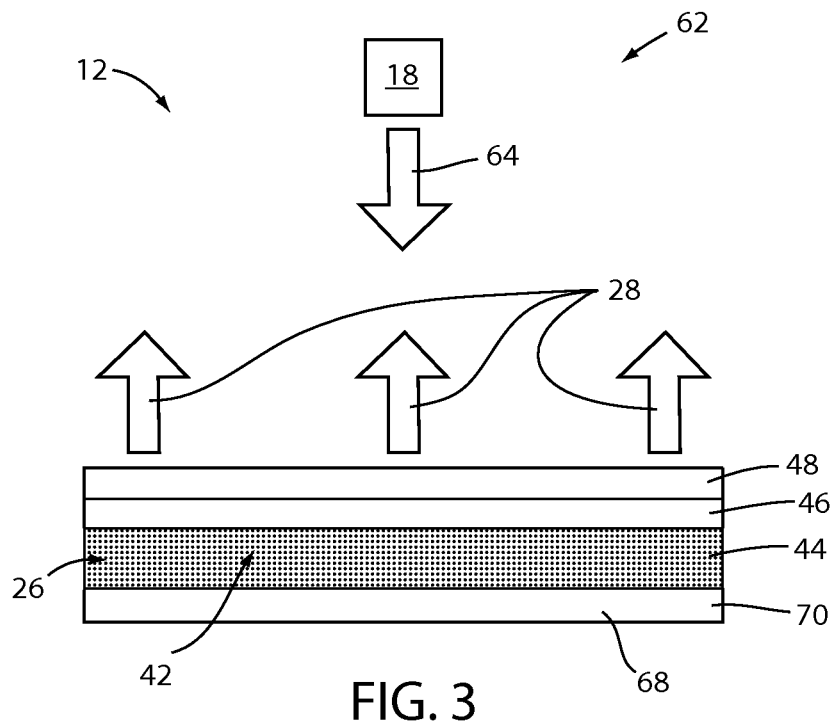
FIG. 3 is schematic view of front-lit configuration of a lighting apparatus configured to convert a first wavelength of light to at least a second wavelength.

Referring to FIG. 3, the lighting apparatus 12 is generally shown according to a front-lit configuration 62. The front-lit configuration may demonstrate an exemplary implementation corresponding to the conversion of a first emission 64 from the light source to the third emission 28 in reference to FIG. 1. The third emission 28 may correspond to the light emitted from the second photoluminescent portion 26 disposed proximate the closure mechanism 16. In this configuration, the light or the first emission 64 emitted from the light source 18 is converted to the third emission 28 by the energy conversion layer 44 of the second photoluminescent portion 26. Though the third emission 28 is discussed in detail in reference to FIG. 3, the second emission 24 corresponding to the first photoluminescent portion 22 may be comprise a similar photoluminescent structure 42 and energy conversion layer 44 as discussed herein. A further detailed description corresponding to the first photoluminescent portion 22 and the second emission 24 is discussed in reference to FIG. 5.

The first emission 64 comprises a first wavelength $\lambda_1$, and the third emission 28 comprises at least a second wavelength $\lambda_2$. The lighting apparatus 12 includes the photoluminescent structure 42 which may be rendered as a coating and applied to a substrate 68 of a vehicle fixture 70, for example the lever 30 of the closure mechanism 16. The photoluminescent material may also be dispersed in the polymer matrix 50 corresponding to the energy conversion layer 44 utilized to form the lever 30. In some implementations, the energy conversion layer 44 may further include the stability layer 46 and/or protective layer 48.

In response to the light source 18 being activated, the first emission 64 is received by the energy conversion layer 44 and converted from the first emission 64 having the first wavelength $\lambda_1$ to the third emission 28 having the second wavelength $\lambda_2$. The third emission 28 may comprise a plurality of wavelengths $\lambda_2$, $\lambda_3$, $\lambda_4$ configured to emit any color of light from the second photoluminescent portion 26. By controlling the color of the third emission 28, the lever 30 of the closure mechanism 16 may be illuminated in a distinct and obvious color to ensure that the lever 30 is easily identified to access the engine compartment 32. In some implementations, the lever 30 may also or similarly be illuminated by resultant light directed toward the lever 30 from a proximate photoluminescent portion.

In various implementations, the lighting apparatus 12 comprises at least one photoluminescent material incorporated in the energy conversion layer 44 and is configured to convert the first emission 64 at the first wavelength $\lambda_1$ to the third emission 28 having at least the second wavelength $\lambda_2$. In order to generate the plurality of wavelengths $\lambda_2$, $\lambda_3$, $\lambda_4$, the energy conversion layer 44 may comprise a red-emitting photoluminescent material, a green-emitting photoluminescent material, and a blue-emitting photoluminescent material dispersed in the energy conversion layer 44. The red, green, and blue-emitting photoluminescent materials may be combined to generate a wide variety of colors of light for the third emission 28. For example, the red, green, and blue-emitting photoluminescent materials may be utilized in a variety of proportions and combinations to control the output color of the third emission 28 which may correspond to a color of the illumination of the lever 30.

Each of the photoluminescent materials may vary in output intensity, output wavelength, and peak absorption wavelengths based on a particular photochemical structure and combinations of photochemical structures utilized in the energy conversion layer 44. As an example, the third emission 28 may be changed by adjusting the wavelength of the first emission 64 to activate the photoluminescent materials at different intensities to alter the color of the third emission 28. In addition to or alternatively to the red, green, and blue-emitting photoluminescent materials, other photoluminescent materials may be utilized alone and in various combinations to generate the third emission 28 in a wide variety of colors. In this way, the lighting apparatus 12 may be configured for a variety of applications to provide a desired lighting effect for the vehicle 10.

The light source 18 may also be referred to as an excitation source and is operable to emit at least the first emission 64. The light source 18 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission 64 from the light source 18 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths $\lambda_2$, $\lambda_3$, $\lambda_4$. The first emission 64 provides an excitation source for the energy conversion layer 44 by targeting absorption wavelengths of the various photoluminescent materials utilized therein. As such, the lighting apparatus 12 may configured to control the third emission 28 to generate a desired light intensity and color.

In an exemplary implementation, the light source 18 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the lighting apparatus 12 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting apparatus 12 creates a visual effect of light originating from the photoluminescent structure 42. In this configuration, light is emitted from the photoluminescent structure 42 (e.g. the first photoluminescent portion 22 and the second photoluminescent portion 26) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photoluminescent material having a wavelength longer than the first wavelength $\lambda_1$ and approximately 430-525 nm. The wavelengths $\lambda_2$, $\lambda_3$, $\lambda_4$ may be utilized to generate a wide variety of colors of light emitted from the first photoluminescent portion 22 and the second photoluminescent portion 26 converted from the first wavelength $\lambda_1$.

Figure 4:
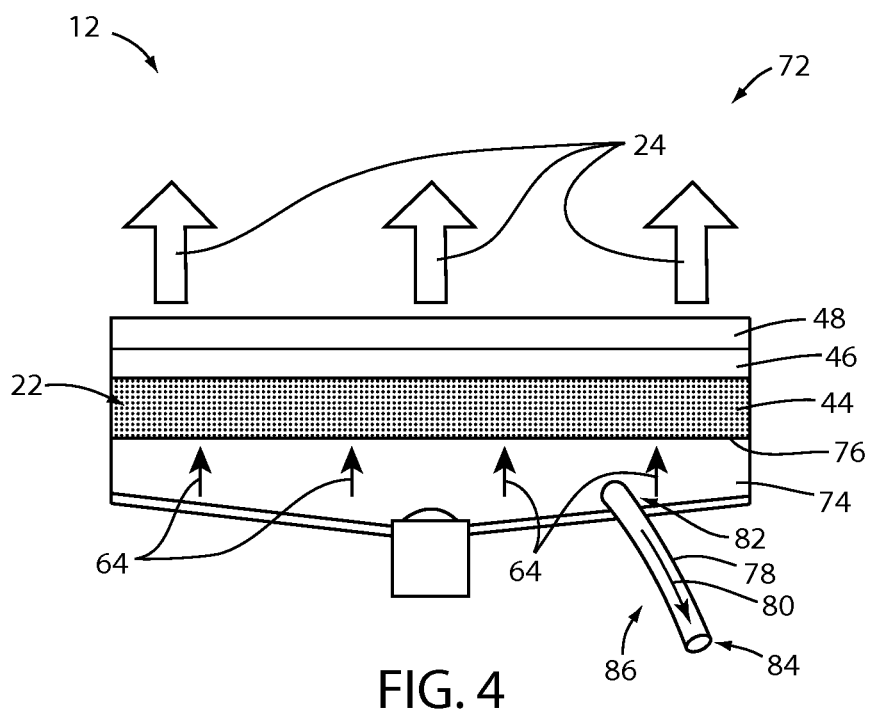
FIG. 4 is schematic view of back-lit configuration of a lighting apparatus configured to convert a first wavelength of light to at least a second wavelength.

Referring to FIG. 4, the lighting apparatus 12 is generally shown according to a back-lit configuration 72 to convert the first emission 64 from the light source 18 to the second emission 24. In this configuration, the lighting apparatus 12 may comprise an optic device 74 configured to direct the light at the first wavelength $\lambda_1$ substantially along the first photoluminescent portion 22. The first photoluminescent portion 22 may comprise the photoluminescent structure 42 in the energy conversion layer 44 disposed as a coating or polymeric matrix disposed on an exterior surface 76 of the optic device 74 of the vehicle badge 14. In this configuration, the vehicle badge 14 may be illuminated by the second emission 24 to provide ambient lighting in a variety of colors.

The optic device 74 may be composed of any material configured to transmit the light at the first wavelength $\lambda_1$ substantially across the extents of the exterior surface 76 abutting the first photoluminescent portion 22. In some implementations, the optic device 74 may comprise a polymeric material configured to provide a refractive index such that the light at the first wavelength is transmitted consistently throughout the exterior surface 76. The first photoluminescent portion 22 and the optic device 74 may form components of the vehicle badge 14 and may be configured to illuminate at least a portion of the vehicle badge 14.

Similar to the front-lit configuration, the backlit configuration 72 comprises the energy conversion layer 44. The energy conversion layer 44 may be configured to be excited in response to receiving the first wavelength $\lambda_1$ of the first emission 64. In response to the excitation, the second emission 24 may output the one or more output wavelengths $\lambda_2$, $\lambda_3$, $\lambda_4$. The one or more of wavelengths $\lambda_2$, $\lambda_3$, $\lambda_4$ of the second emission 24 may be configured to emit any color of light from the first photoluminescent portion 22 in response to the excitation of the energy conversion layer 44. The color of the light corresponding to the second emission 24 may be controlled by utilizing a particular ratio of photoluminescent materials as discussed herein.

In some implementations, the backlit configuration 72 may further comprise a light guide 78 configured to direct a portion 80 of the first emission 64 comprising the first wavelength $\lambda_1$ from the optic device 74 along a length of the light guide 78. The light guide 78 comprises a proximal end portion 82 configured to receive the portion 80 of the first emission 64 and a distal end portion 84 configured to emit the portion 80 of the first emission 64. In some implementations, the light guide 78 may be utilized to transmit the portion 80 of the first emission 64 from the optic device 74 to provide an intermediate light delivery member 86.

The light guide 78 may be composed of a material configured to transmit the portion 80 of the first emission 64. In some implementations, the light guide may comprise a light pipe composed of polymeric material. The light guide may comprise a total internal reflective body and be configured to have a refraction index configured to ensure that the portion 80 of the first emission 64 is transmitted efficiently from the proximal end portion 82 to the distal end portion 84. The intermediate light delivery member 86, as described herein may refer to a light source or intermediate body acting as a light source by delivering light supplied from an active light source, for example the light source 18.

Referring to FIGS. 1, 3 and 4, the light guide 78 may be configured to transmit the portion 80 of the first emission 64 at the first wavelength $\lambda_1$ proximate the closure mechanism 16. For example, the intermediate light delivery member 86, corresponding to the distal end portion 84, may be configured to deliver the portion 80 of the first emission to provide the first emission 64 for the light source 18 shown in the front-lit configuration 62. In this configuration, the portion 80 of the first emission 64 at the first wavelength $\lambda_1$ may be utilized to excite the second photoluminescent portion 26 to illuminate the lever 30 of the closure mechanism 14. Further details describing the relationship of the light guide 78 relative to the first photoluminescent portion 22 of the vehicle badge 14 and the second photoluminescent portion 26 of the closure mechanism 16 are discussed in reference to FIGS. 5-8.

Figure 5:
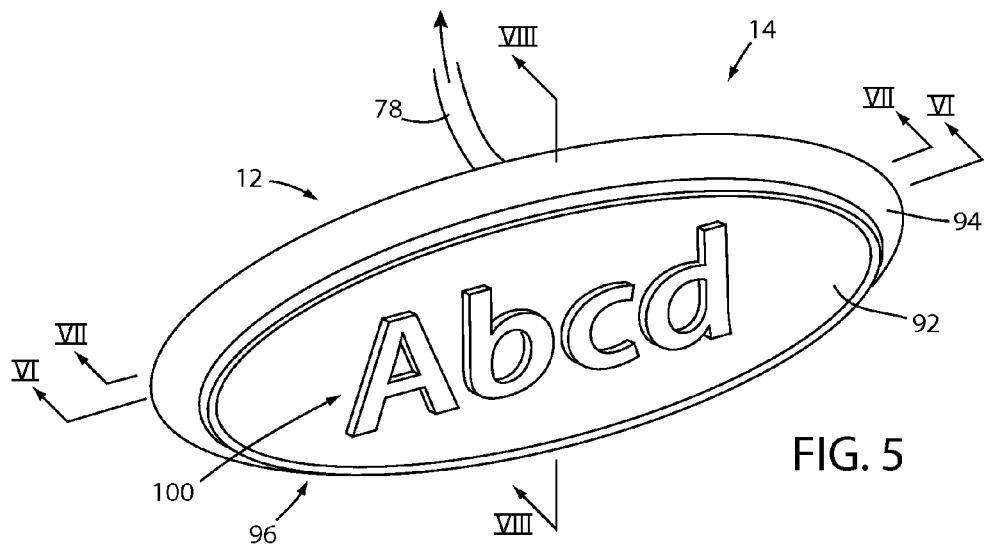
FIG. 5 is perspective view of a vehicle badge comprising a lighting apparatus.
Figure 6:
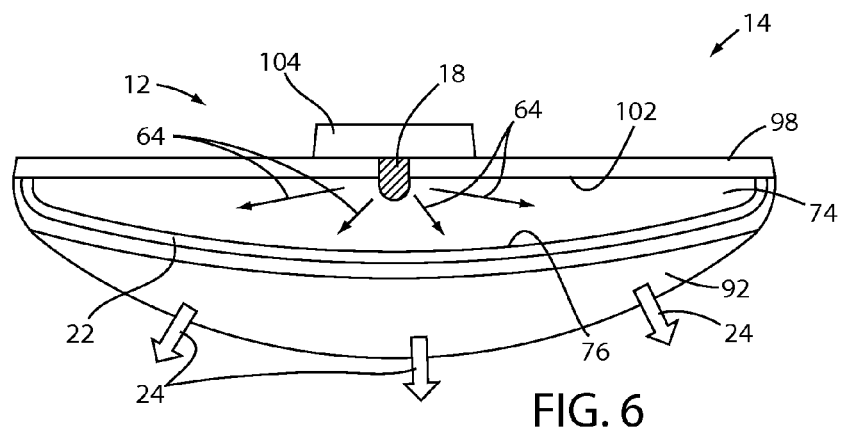
FIG. 6 is a projected cross-sectional view along section line VI of a vehicle badge demonstrating an optic device.
Figure 7:
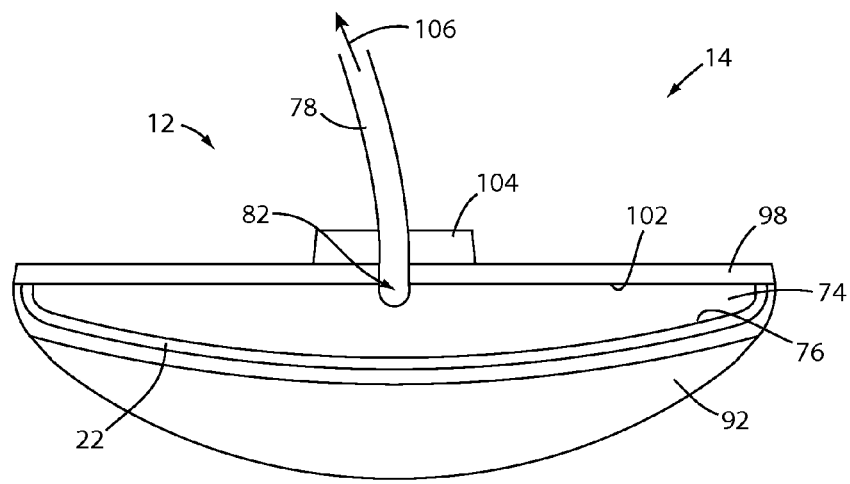
FIG. 7 is a projected cross-sectional view along section line VII of a vehicle badge demonstrating a light guide.

Referring to FIGS. 5-7 a plurality of views of the vehicle badge 14 are shown. In the illustrated implementation, the lighting apparatus 12 comprises the light guide 78 configured to illuminate the vehicle badge 14 and the closure mechanism 16. The vehicle badge 14 comprises an external cover 92 and in some implementations may comprise a bezel 94. The external cover 92 may define a profile shape 96 of the vehicle badge 14. The vehicle badge 14 may further comprise a base portion 98. A graphic 100 may be disposed proximate the external cover 92. The graphic 100 may comprise a design, text, and/or a form and may be configured to illuminate in response to an activation of the light source 18. The graphic 100 may form an outline or relief configured to emit the second emission 24 to illuminate the graphic 100.

Referring to the cross-section along section line VI, the optic device 74 is disposed between the external cover 92 and the base portion 98. An interior surface 102 of the optic device 74 is configured to abut the base portion 98 and the exterior surface 76 is configured to substantially follow the profile shape 96 of the external cover 92. The first photoluminescent portion 22 may be disposed between the exterior surface 76 of the optic device 74 and the external cover 92. The light source 18 may be disposed in the vehicle badge 14 such that the light source 18 and the vehicle badge 14 form a sealed assembly.

In some implementations, the light source is disposed in the optic device 74 proximate the interior surface 102 to form the sealed assembly configured to protect the light source 18. The light source 18 may further be molded into the optic device 74 to form the sealed assembly. A control circuit 104 may be disposed on the base portion 98 and in communication with a power source to supply power to and control the light source 18. In this configuration, the light source 18 may be protected from an operating environment of the vehicle 10 to provide for robust, lasting operation in a variety of operating conditions.

Referring to the cross-section along section line VII, the proximal end portion 82 of the light guide 78 is shown in optical communication with the optic device 74. The proximal end portion 82 is disposed in the optic device 74 proximate the light source 18 such that a portion 80 of the first emission 64 having the first wavelength $\lambda_1$ is received by the proximal end portion 82. The portion 80 of the first emission 64 may then be transmitted through the light guide 78 toward the distal end portion 84 demonstrated by a directional arrow 106. The portion 80 of the first emission 64 transmitted through the light guide 78 may be utilized to deliver light at the first wavelength $\lambda_1$ proximate the closure mechanism 16 as demonstrated in FIG. 8.

Figure 8:
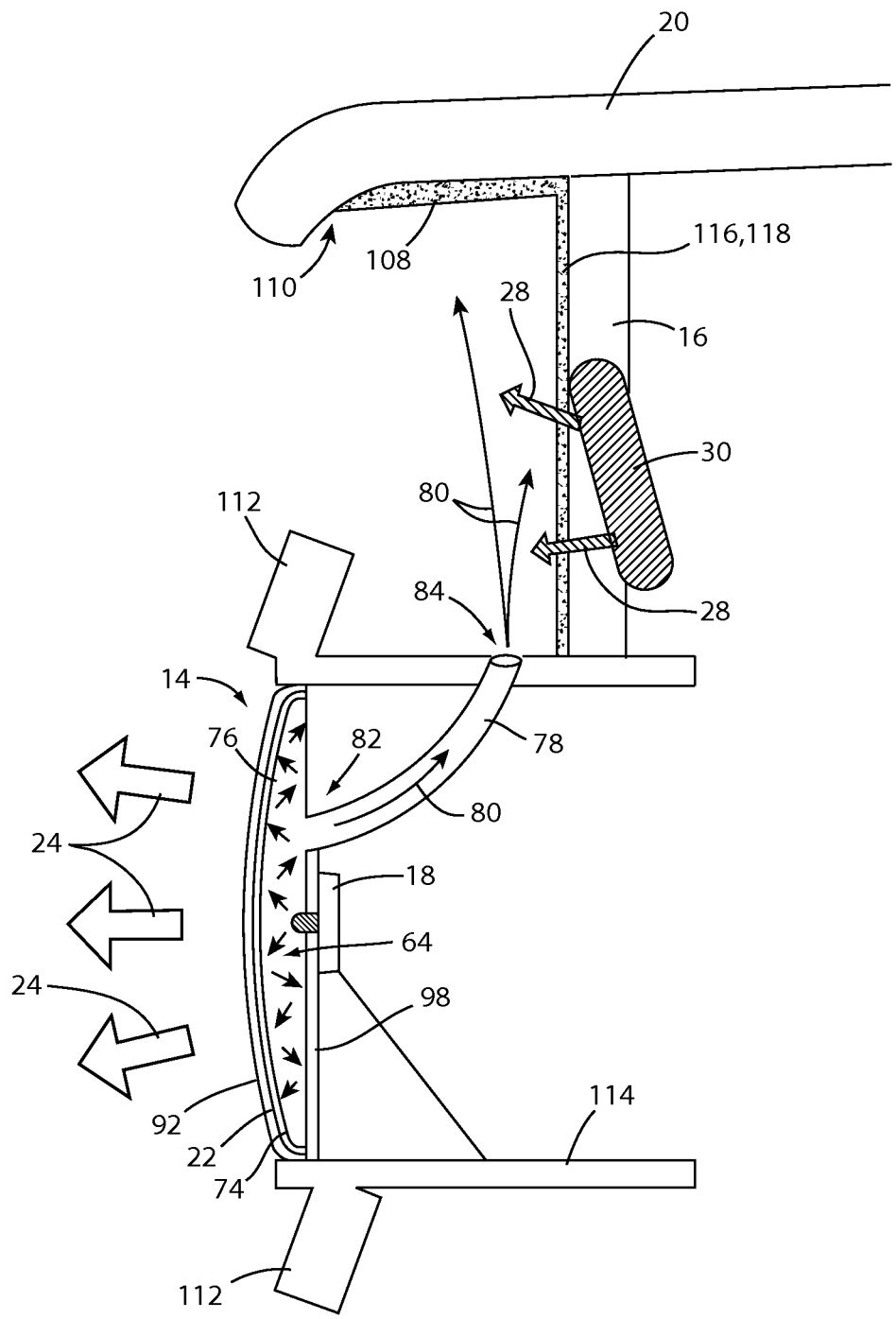
FIG. 8 is a side cross-sectional view along section line VIII demonstrating a vehicle badge disposed proximate a closure of a vehicle.

Referring to FIG. 8, a side cross-sectional view of the vehicle badge 14 disposed proximate the hood 20 of the vehicle 10 is shown along section line VIII to demonstrate the illumination of the closure mechanism 16. The vehicle badge 14 is shown in connection with a front grill 112 comprising a support structure 114 configured to secure the vehicle badge 14 to the vehicle 10. The proximal end portion 82 of the light guide 78 is shown in connection with the optic device 74 and the distal end 84 is directed toward the closure mechanism 16. The lever 30 of the closure mechanism 16 is configured to release the closure mechanism 16 to allow the hood 20 to be released such that the hood 20 may be maneuvered to an open position.

As demonstrated in FIG. 8, the first emission 64 having the first wavelength $\lambda_1$ from the light source 18 is directed into the optic device 74. The optic device 74 is configured to distribute the first emission substantially along the exterior surface 76 such that the first photoluminescent portion 22 may become excited and emit the second emission 24. The second emission 24 is transmitted outward from the vehicle badge 14 through the external cover 92 to illuminate the vehicle badge 14. The portion 80 of the first emission 64 is transmitted into the proximal end portion 82 through the light guide 78 and outward from the distal end portion 84.

The portion 80 of the first emission 64 emitted from the distal end portion 84 is directed outward toward the closure mechanism 16 and the lever 30. In some implementations, the lever 30 may comprise the second photoluminescent portion 26. In response to receiving the portion 80 of the first emission 64, the second photoluminescent portion 26 may become excited and emit the third emission 28. The third emission 28 may then be output from the second photoluminescent portion 26 such that the lever 30 is visible to release the closure mechanism 16. In some implementations, the second photoluminescent portion 26 may be applied as a coating 116 disposed proximate the closure mechanism 16 and an interior portion 110 of the hood 20.

The coating 116 may also comprise a third photoluminescent portion 118. The third photoluminescent portion 118 may be configured to emit a fourth emission in response to an excitation caused by the first wavelength $\lambda_1$ of the portion 80 of the first emission 64. The third photoluminescent portion 118 may be configured similar to the first photoluminescent portion 22 and the second photoluminescent portion 26. As discussed herein, each of the photoluminescent portions 22, 26, 118 may comprise any combination of photoluminescent materials disposed in a photoluminescent structure 42 configured to emit light in a wide variety of colors in the visible color spectrum. Each of the second emission 24, the third emission 28, and the fourth emission may comprise similar colors or any combination of colors.

The lighting apparatus 12 discussed in this disclosure may provide a cost-effective apparatus operable to provide decorative lighting for a vehicle badge. Additionally, in some implementations, the lighting apparatus 12 may be configured to illuminate a lever configured to unlock a closure mechanism, for example a hood latch of a vehicle. In addition to these benefits, additional photoluminescent portions may be incorporated to provide lighting for accents and utility for various applications. Though the apparatus and systems disclosed are described in detail in reference to the vehicle badge 14 and the closure mechanism 16, those skilled in the art will acknowledge that the disclosure may be applied to in a variety of implementations without departing from the spirit of the disclosure.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An emblem illumination assembly for a vehicle comprising:
   an optic device having a profile shape comprising an interior surface and an exterior surface; and
   a light source proximate the interior surface configured to emit a first emission into the optic device, wherein the optic device comprises a photoluminescent material disposed on the exterior surface of the optic device, the photoluminescent material configured to convert the first emission to emit a second emission.

2. The assembly according to claim 1, wherein the optic device is configured to spread the first emission substantially along the profile shape.

3. The assembly according to claim 1, wherein the photoluminescent material substantially covers the exterior surface.

4. The assembly according to claim 3, wherein the optic device is configured to substantially spread the first emission along the profile shape to excite the photoluminescent material to uniformly illuminate the exterior surface with the second emission.

5. The assembly according to claim 1, wherein the light source is disposed in the optic device proximate the interior surface to form a sealed assembly configured to protect the light source.

6. The assembly according to claim 5, wherein the light source is molded into the optic device to form the sealed assembly.

7. The assembly according to claim 1, wherein the interior surface comprises a reflective coating configured to direct the second emission outward through the exterior surface.

8. The assembly according to claim 1, further comprising:
   a light guide extending from the optic device toward a lever of a hood latch to direct the first emission toward the lever.

9. An illumination system for a vehicle badge comprising:
   a badge comprising:
      an optic device; and
      a light source configured to output a first emission at a first wavelength; and
   a light guide connected to the optic device configured to transmit the first emission toward a closure mechanism; and
   a first photoluminescent portion proximate a lever of the closure mechanism to convert the first emission to a second emission to illuminate the lever.

10. The illumination system according to claim 9, wherein the second emission comprises a second wavelength longer than the first wavelength.

11. The illumination system according to claim 9, wherein the optic device comprises and a second photoluminescent portion configured to convert a first portion of the first emission to a third emission to illuminate at least a portion of the badge.

12. The illumination system according to claim 11, wherein the light guide is configured to transmit a second portion of the first emission toward the lever of the closure mechanism.

13. The illumination system according to claim 11, wherein the third emission comprises a third wavelength longer than the first wavelength.

14. The illumination system according to claim 10, wherein the second wavelength and the third wavelength correspond to different colors.

15. The illumination system according to claim 9, wherein the closure mechanism comprises a secondary safety latch for the hood of the vehicle.

16. A vehicle lighting system comprising:
   a badge comprising an optic having a light source configured to output a first emission at a first wavelength; and
   a light guide extending from the optic and configured to direct the first emission toward a closure mechanism, wherein the badge and the closure mechanism comprise a photoluminescent portion configured to convert the first emission to a second emission to illuminate the badge and the closure mechanism at a second wavelength.

17. The lighting system according to claim 16, wherein the second wavelength is longer than the first wavelength.

18. The lighting system according to claim 16, wherein the light source comprises a deep blue LED molded in an interior surface of the optic device to form a sealed assembly.

19. The lighting system according to claim 18, wherein the deep blue LED is configured to emit light at a peak wavelength less than 500 nm.

20. The lighting system according to claim 16, wherein the photoluminescent portion comprises a first photoluminescent portion and a second photoluminescent portion, the first photoluminescent portion configured to illuminate the badge in the second wavelength of light having first color and the second photoluminescent portion configured to illuminate the closure mechanism in a third wavelength of light having a second color different from the first color.

* * * * *